US011018790B2

(12) United States Patent
Cotter

(10) Patent No.: US 11,018,790 B2
(45) Date of Patent: May 25, 2021

(54) TIMING ADJUSTMENT FOR DISTRIBUTED NETWORK ARCHITECTURE

(71) Applicant: ARRIS Enterprises LLC, Suwanee, GA (US)

(72) Inventor: Anthony John Cotter, Ballincollig (IE)

(73) Assignee: ARRIS Enterprises LLC, Suwanee, GA (US)

( * ) Notice: Subject to any disclaimer, the term of this patent is extended or adjusted under 35 U.S.C. 154(b) by 91 days.

(21) Appl. No.: 15/804,221

(22) Filed: Nov. 6, 2017

(65) Prior Publication Data

US 2019/0140758 A1 May 9, 2019

(51) Int. Cl.
| | |
|---|---|
| *H04J 3/06* | (2006.01) |
| *H04L 12/28* | (2006.01) |
| *H04B 1/74* | (2006.01) |
| *H04J 3/14* | (2006.01) |
| *H04L 12/26* | (2006.01) |

(52) U.S. Cl.
CPC .............. *H04J 3/0667* (2013.01); *H04B 1/74* (2013.01); *H04J 3/0641* (2013.01); *H04J 3/14* (2013.01); *H04L 12/2801* (2013.01); *H04L 43/0811* (2013.01)

(58) Field of Classification Search
CPC .......... H04J 3/0667; H04J 3/0641; H04J 3/14; H04B 1/74; H04L 12/2801
USPC ........................................................ 709/224
See application file for complete search history.

(56) References Cited

U.S. PATENT DOCUMENTS

| | | | |
|---|---|---|---|
| 7,139,923 B1 | 11/2006 | Chapman et al. | |
| 7,539,208 B2 | 5/2009 | Chapman et al. | |
| 2003/0053493 A1 | 3/2003 | Graham et al. | |
| 2004/0202202 A1* | 10/2004 | Kolze ................... | H04J 3/0688 370/503 |
| 2005/0180466 A1* | 8/2005 | Franchuk .............. | H04J 3/0638 370/503 |
| 2006/0034250 A1* | 2/2006 | Kim ...................... | H04B 7/2696 370/350 |
| 2006/0083265 A1* | 4/2006 | Jordan .................. | H04J 3/0682 370/503 |

(Continued)

OTHER PUBLICATIONS

Geoffrey M. Garner, "IEEE 1588 Version 2", ISPCS 2008, Sep. 24, 2008, 89 pages.

(Continued)

*Primary Examiner* — Zi Ye
(74) *Attorney, Agent, or Firm* — Chernoff, Vilhauer, McClung & Stenzel, LLP

(57) ABSTRACT

In some embodiments, a first computing device detects a loss of a connection to a first source of timing information that the first computing device and a second computing device use to maintain synchronization with a first clock and a second clock. The first computing device receives a second source of timing information from the second computing device. The second source of timing information is also being transmitted to a third computing device. The first computing device uses the second source of timing information to determine a first timestamp and determines a second timestamp from the first clock. The first computing device uses the first timestamp and the second timestamp to adjust a rate of the first clock where the first clock is used to transmit the second source of timing information from the second computing device to the third computing device.

20 Claims, 8 Drawing Sheets

(56) References Cited

U.S. PATENT DOCUMENTS

| | | | |
|---|---|---|---|
| 2006/0168612 A1* | 7/2006 | Chapman | G06F 11/0709 725/11 |
| 2010/0100761 A1* | 4/2010 | Carlson | H04J 3/0641 714/4.1 |
| 2011/0200051 A1 | 8/2011 | Rivaud et al. | |
| 2015/0063375 A1* | 3/2015 | Tzeng | H04J 3/0667 370/512 |
| 2015/0207579 A1* | 7/2015 | Chapman | H04J 3/0667 370/503 |
| 2015/0295669 A1 | 10/2015 | Chapman et al. | |

OTHER PUBLICATIONS

Larry Samberg, "Adaptive Clock Recovery (ACR)", MEF Wiki, Oct. 9, 2016, 1 page.

Dan Glass, "What Happens if GPS Fails", The Atlantic, Jun. 13, 2016, 8 pages.

Extended European Search Report, Re: Application No. 18204603.7, dated Mar. 29, 2019.

* cited by examiner

TIMING ADJUSTMENT FOR DISTRIBUTED NETWORK ARCHITECTURE

BACKGROUND

In a network implementation, such as a data over cable service interface specification (DOCSIS), a physical (PHY) device can be located in the headend that converts packets on a digital interface, such as an Ethernet interface, to analog signals, such as radio frequency (RF) signals, on a hybrid fiber coaxial (HFC) network. The physical device sends the RF signals to modems located at a subscriber's premises. However, other implementations have moved the physical device to a location closer to the subscriber's premises, such as in a node located in the neighborhood where the subscribers are located. The relocated physical device is referred to as a remote physical device (RPD).

Relocation of the physical device to a remote location from the headend requires that a headend device, such as a converged cable access platform (CCAP) core, maintain timing synchronization with the RPD. In one example, a protocol, such as the 1588 protocol, is used to synchronize the timing by passing messages between a 1588 timing server and the headend device and also the 1588 timing server and the RPD. The messages compare timestamps from the 1588 timing server with a local copy of a timestamp in both the headend and the remote physical device. The differences between the timestamps of the 1588 timing server and either the headend device or the RPD are used to adjust the respective clocks of the headend device and RPD to make sure the local clocks track the timing server's clock. This maintains the timing synchronization between the headend device and the RPD. However, if the 1588 timing server was to go offline for any significant duration, the clock of the RPD might drift. If the clock of the RPD drifts, modems coupled to the RPD may go offline due to the mismatch in timing between the RPD clock and the headend clock.

DETAILED DESCRIPTION

Figure 1:
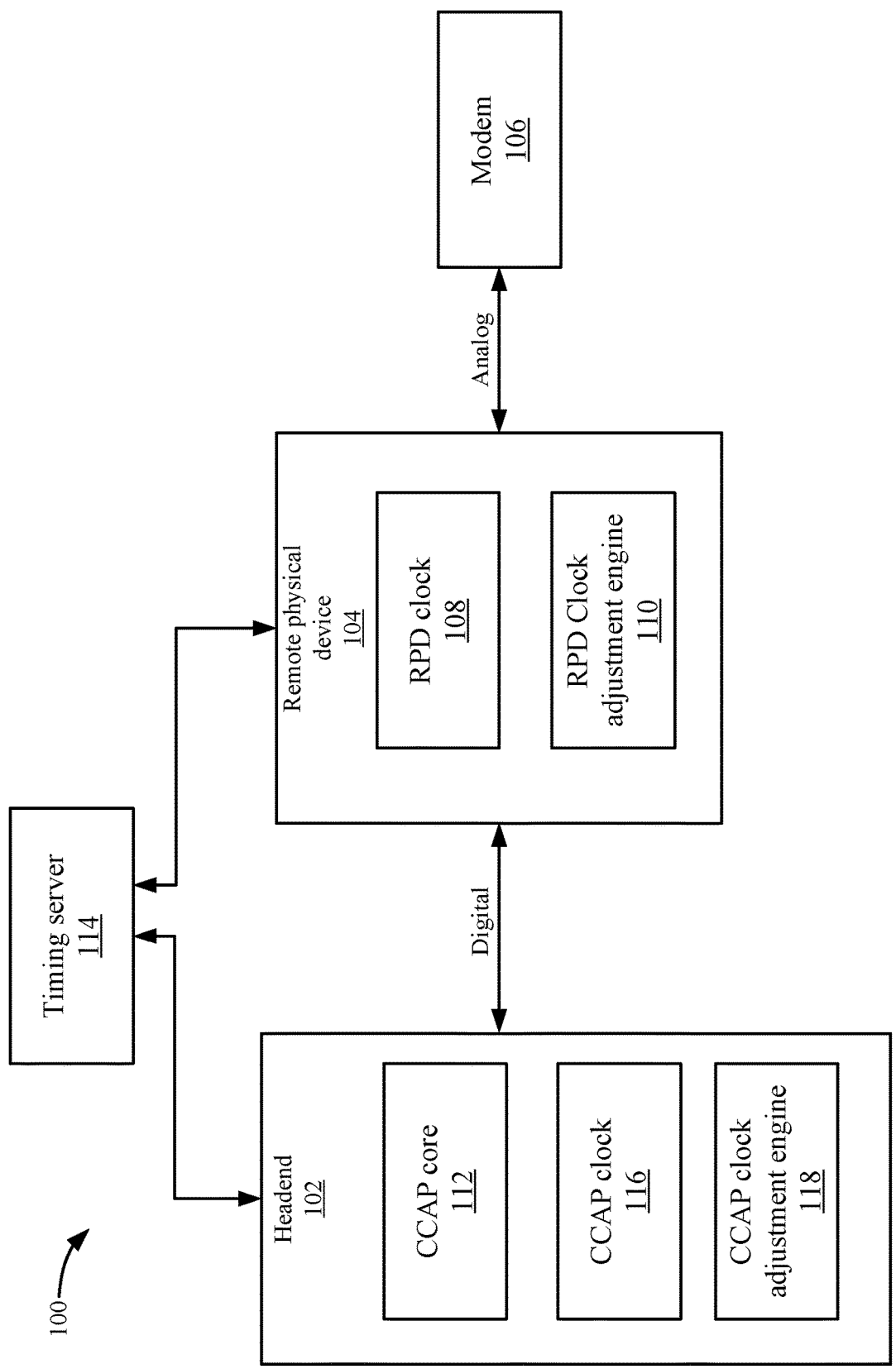
FIG. 1 depicts a simplified system of a method for maintaining timing synchronization according to some embodiments.

Described herein are techniques for a clock adjustment system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In a network, a physical device (PHY) in a node may be separated from the media access control (MAC) device in a headend. For example, in a distributed converged cable access platform (CCAP), a remote physical device (RPD) is separated from the MAC device (e.g., a CCAP core). A timing server may maintain a timing synchronization between the CCAP core and the remote physical device. For example, the timing server may use a protocol, such as the 1588 protocol, to maintain synchronization between a CCAP clock in the headend and an RPD clock in the node.

When the timing synchronization is lost, such as in the CCAP core or the remote physical device, some embodiments detect the loss and then can adjust either the remote physical device clock or the CCAP clock to maintain timing synchronization such that modems downstream from the RPD do not go offline. The adjustment may use a secondary source of timing information different from the timing server to adjust the RPD clock or CCAP clock. For example, the remote physical device may receive bandwidth allocation maps (MAPs) that define minislots in which the modems can transmit upstream. The remote physical device can convert a minislot into a first timestamp. The remote physical device also can determine a second timestamp (e.g., the current time) from the RPD clock and compare the first and second timestamps. The first timestamp represents that time that a modem can transmit upstream, which should be sometime in the future compared to the second timestamp. The first timestamp is in the future because the remote physical device still needs to send the MAP to the modem, which then needs to process the MAP before the first timestamp is reached. If the modems receive the bandwidth allocation maps late and miss respective minislot times to transmit upstream, eventually the modems will go offline.

The remote physical device uses the difference between the first timestamp and the second timestamp to adjust the RPD clock, if needed. For example, before the timing synchronization was lost, the RPD monitors a time difference between the RPD timestamp and the minislot timestamp over a time period. The difference typically averages a time, such as 5 milliseconds (ms) such that modems can receive the MAP and have time to process the MAP and transmit upstream during the allocated minislot. The remote physical device then calculates the difference between the RPD timestamp and the minislot timestamp. The remote physical device inputs the difference into a RPD clock adjustment engine, which can use the difference to adjust the RPD clock, if needed. In some examples, the remote physical device receives many bandwidth allocation maps every few milliseconds and can continuously calculate the difference and input the difference into the RPD clock adjustment engine. As the differences change, the RPD clock adjustment engine can adjust the clock to be faster or slower, if needed. The adjustment keeps the difference between the RPD timestamp and minislot timestamp around the same as before timing synchronization was lost with the timing server. By keeping the difference around the same, the modems have time to receive the bandwidth allocation map, process the bandwidth allocation map, and then transmit upstream when the modems' respective minislot is encountered. The adjustment thus keeps the modems from going offline because the modems still receive the bandwidth allocation maps within a time that allows the modems to transmit upstream during respective minislots. The process does not lock both the RPD clock and the CCAP together to a time; however, the process attempts to keep the modems online until the connection to the timing server is restored.

FIG. 1 depicts a simplified system 100 of a method for maintaining timing synchronization according to some embodiments. System 100 includes a headend 102, a remote physical device 104, and a modem 106. Headend 102 and remote physical device 104 may be separated by a network, such as a digital network, (e.g., an Ethernet of an optical network). For example, remote physical device 104 may be located in a node that is located closer to the premises of a subscriber compared to headend 102. The premises of the subscriber includes a network device, such as a modem 106 (e.g., a cable modem). Although modem 106 is described, other devices may be used, such as a gateway, customer premise equipment (CPE) including a set top box, etc. Although this architecture is described, other distributed architectures may be used. Further, the processes described may also be applied to different architectures in which time synchronization needs to be maintained between multiple devices.

In some examples, the MAC and PHY layers are split and the PHY layer is moved to remote physical device 104 while a CCAP core 112 performs media access control (MAC) layer processing. CCAP core 112 contains both a cable modem termination system (CMTS) core for DOCSIS and an edge quadrature amplitude modulation (EQAM) core for video. The CMTS core contains a DOCSIS MAC component that uses DOCSIS to process all signaling functions downstream and upstream for bandwidth scheduling and DOCSIS framing. The EQAM core is associated with video processing functions.

In some examples, CCAP core 112 sends media access control (MAC) messages over a digital medium, such as Ethernet or a passive optical network (PON), to remote physical device 104. The MAC messages are received as electrical signals at remote physical device 104 and remote physical device 104 converts the electrical signals to an analog signal, such as a radio frequency (RF) signal. Remote physical device 104 sends the RF signal over an analog medium, such as a coaxial network, to modem 106. Modem 106 can then provide the signals to various subscriber end devices. The subscriber end devices may also send data upstream and modems 106 may transmit the data from the subscriber end devices upstream to remote physical device 104. Remote physical device 104 then converts the RF signals to digital and sends the digital signals to CCAP core 112. Additionally, modems 106 may transmit upstream to maintain a connection to remote physical device 104, which may be referred to as ranging.

Remote physical device 104 includes downstream QAM modulators and upstream QAM de-modulators to modulate downstream and upstream traffic. Also, remote physical device 104 converts downstream DOCSIS signaling video, and out-of-band signals received from CCAP core over the digital medium to analog for transmission over radio frequency or linear optics. Remote physical device 104 converts upstream DOCSIS signals received from an analog medium to digital for transmission over the digital medium and sends those signals to CCAP core 112.

As discussed above, because the remote physical device is located separately from headend 102, remote physical device 104 needs to maintain timing synchronization with CCAP core 112. System 100 uses timing server 114 to maintain timing synchronization between CCAP core 112 and remote physical device 104. Timing server 114 may be a separate device from headend 102 and remote physical device 104. In other examples, timing server 114 may be situated in headend 102. Also, one or more timing servers 114 may be used, such as a first timing server 114 may be used to synchronize timing with headend 102 and a second timing server 114 may be used to synchronize timing with remote physical device 104. Timing server 114 may use a protocol, such as the 1588 protocol, to synchronize the timing between headend 102 and remote physical device 104. The synchronization locks CCAP clock 116 and RPD clock 108 to a time that is synchronized with timing server 114. That is, each clock may operate at the same rate.

As discussed above, at some points, the timing synchronization may be lost, such as timing server 114 may go offline or there may be some network elements, such as switches, that prevent communication between timing server 114 and headend 102 and/or remote physical device 104. When timing synchronization is lost with timing server 114, some embodiments use a process to maintain timing synchronization such that modems 106 that are coupled to remote physical device 104 do not go offline. This may not lock CCAP clock 116 and RPD clock 108 to a time or rate together, but adjusts either CCAP clock 116 and RPD clock 108 to keep modems 106 online. CCAP clock 116 and RPD clock 108 may be based on an oscillator whose frequency can be adjusted, such as digitally.

Remote physical device 104 or CCAP core 112 may use a second source of timing information to adjust either CCAP clock 116 or RPD clock 108 such that communications in system 100 can continue. In some embodiments, the second source of timing is received in communications being sent from CCAP core 112 for modem 106, such as in a bandwidth allocation map. The bandwidth allocation maps include minislots that define times in which modems 106 can send bursts upstream. Each minislot value in the bandwidth allocation map corresponds to the start of each allocation grant. In the process, remote physical device 104 sends the bandwidth allocation maps downstream to modems 106. Modems 106 can then read the bandwidth allocation maps and determine when an allocation grant is provided to it to determine when to send a burst upstream. However, if modem 106 receives the bandwidth allocation map for a time in the past, then that modem 106 has missed its time to transmit upstream. This scenario might occur if RPD clock 108 is going too fast relative to CCAP clock 116. For example, remote physical device 104 may need to receive bandwidth allocation maps by a certain time, such as 5 milliseconds (ms), before a minislot time in which an upstream burst is scheduled for a first modem 106 in the bandwidth allocation map. If a modem 106 receives the bandwidth allocation map after a minislot time for that modem 106, then that modem 106 will miss its minislot to send a burst upstream. If multiple upstream bursts are missed, then a modem 106 may go offline. It is possible that a late bandwidth allocation map may cause modems corresponding to earlier minislots to miss their slots, but modems corresponding to later minislots make receive the bandwidth allocation map in time to send the bursts upstream.

CCAP core 112 sends bandwidth allocation maps periodically, such as every few milliseconds, to remote physical device 104. CCAP core 112 uses CCAP clock 116 to generate the bandwidth allocation maps. Then, remote physical device 104 uses RPD clock 108 to send the bandwidth allocation maps to modem 106. After losing a connection with timing server 114, when RPD clock 108 starts to drift, an RPD clock adjustment engine 110 in remote physical device 104 uses the bandwidth allocation maps to adjust a rate of RPD clock 108. For example, RPD clock adjustment engine 110 may adjust the rate of RPD clock 108 such that a time difference between a RPD timestamp of RPD clock 108 and the minislot timestamp remains substantially constant, such as substantially around the time difference that existed before timing synchronization was lost. It is possible that RPD clock 108 may drift in comparison to CCAP clock 116; however, maintaining the time difference allows remote physical device 104 to send the bandwidth allocation maps to modems 106 in enough time such that modems 106 do not miss minislot times to transmit upstream.

In addition to RPD clock 108 possibly losing timing synchronization, CCAP core 112 may also lose timing synchronization with timing server 114. In some examples, a CCAP clock adjustment engine 118 can use upstream signals, such as bursts from modem 106, to maintain timing synchronization. As with RPD clock adjustment engine 110, CCAP clock adjustment engine 118 is not maintaining a lock with RPD clock adjustment engine 110 when timing synchronization is lost with timing server 114, but rather adjusting the CCAP timing based on the upstream bursts that are received. For example, modems 106 may send upstream bursts that include the minislot times associated with their upstream bursts. CCAP clock adjustment engine 118 can then use those minislot times to adjust CCAP clock 116. For example, if the burst arrives later than expected, then, maybe that CCAP clock 116 is too slow and CCAP clock adjustment engine 118 adjusts CCAP clock 116 to run faster.

The following will now describe both adjustment processes in more detail.

RPD Clock Adjustment

Figure 2:
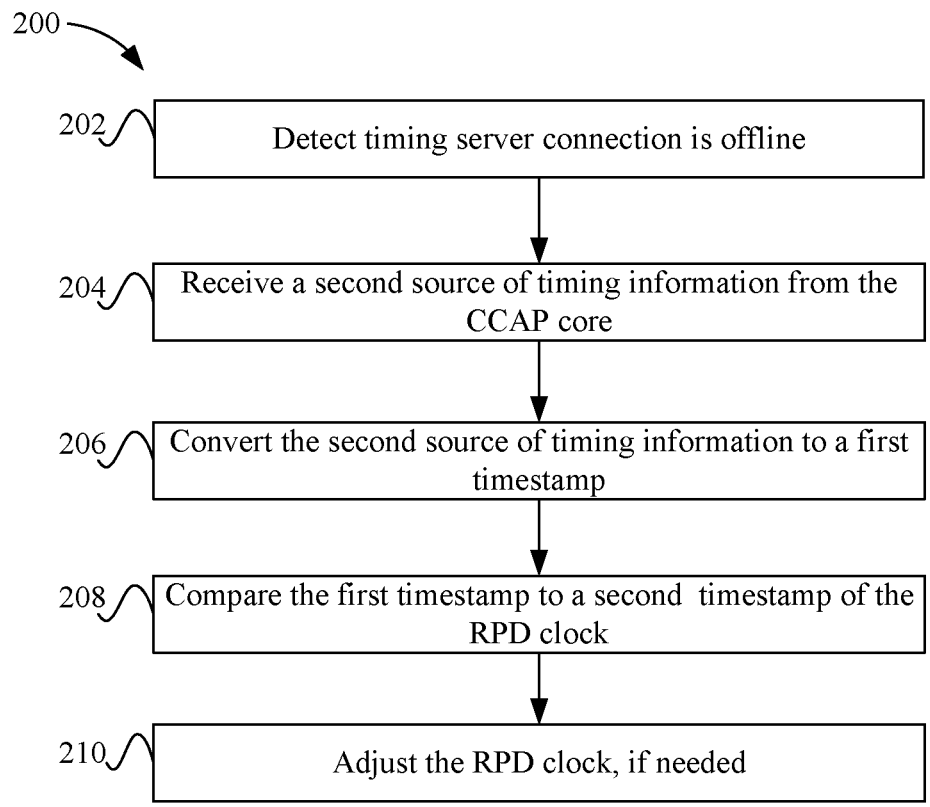
FIG. 2 depicts a simplified flowchart of a method for adjusting a RPD clock according to some embodiments.

FIG. 2 depicts a simplified flowchart 200 of a method for adjusting RPD clock 108 according to some embodiments. At 202, RPD clock adjustment engine 110 detects that a connection to timing server 114 is offline (e.g., a connection is lost). RPD clock adjustment engine 110 may detect the loss of the connection based on messages not being received from timing server 114 or some delay in receiving messages. For example, remote physical device 104 should receive messages from timing server 114 periodically at certain defined intervals. If a number of messages over a threshold are not received or received late, then RPD clock adjustment engine 110 may determine that the connection with timing server 114 is offline.

At 204, RPD clock adjustment engine 110 receives a second source of timing information. For example, CCAP core 112 may generate bandwidth allocation maps that include information that RPD clock adjustment engine 110 can convert into timing information. As discussed above, the minislot value contains a time slot that defines when a modem 106 can transmit a burst upstream. Although the minislot value is discussed, other information that defines when communications can occur in system 100 may be used. For example, the information received from CCAP core 112 may define a specific time when modem 106 can transmit upstream instead of a minislot value or when remote physical device 104 can transmit downstream instead of when modem 106 can transmit upstream. Thus, minislot values do not need to be used. Also, the second source of timing information may be other timing values that RPD clock adjustment engine 110 can use, such as any timing values that can be derived from communications that are performed in system 100 while the timing synchronization is lost. One advantage of using minislot values is that the bandwidth allocation maps are typically sent and also sent very frequently. Thus, no extra bandwidth is being added to system 100 by using the already being sent bandwidth allocation maps.

At 206, RPD clock adjustment engine 110 converts the second source of timing information to a first timestamp. The first timestamp may be a first time in which a modem 106 can transmit upstream. The conversion from the minislot value to the first timestamp may depend upon the configuration of system 100. For example, minislots may be separated by a time interval. RPD clock adjustment engine 110 can take the minislot value and determine a time value that can be compared to RPD clock 108. For a first configuration, such as an Advanced Time Division Multiple Access (ATDMA) upstream channel type, a minislot is configured to be a power of 2 multiple of the DOCSIS 6.25 microsecond tick. Thus, minislot sizes would be 6.25 μs, 12.5 μs, 25 μs, 50 μs etc. Therefore, the timestamp in microseconds is derived by multiplying the minislot count by the number of microseconds per minislot. The minislot count is a 26 bit number and laps in about 7 minutes so this is extended to a 64 bit number by comparison with the current time. For another configuration, such as a Synchronous Code Division Multiple Access (SCDMA) channel type, a frame is configured with a number of minislots and a start reference timestamp. Thus, any future timestamp can be calculated based on the start reference and the number of elapsed minislots since that reference. In other examples, the bandwidth allocation map may include the first timestamp and RPD clock adjustment engine 110 does not need to perform the conversion.

At 208, RPD clock adjustment engine 110 compares the first timestamp to a second timestamp of RPD clock 108. The second timestamp may be a current time of RPD clock 108. RPD clock adjustment engine 110 may determine a difference between the second timestamp and the first timestamp using the comparison. This difference may determine the amount of time that modem 106 has to process the bandwidth allocation map before having to transmit the upstream burst. For example, if the difference from the second timestamp to the first timestamp is 5 milliseconds, which is the current time compared to a time in the future, then the first modem 106 that is scheduled to transmit in the first minislot should have around 5 milliseconds to receive the bandwidth allocation map, process it, and then be able to transmit a burst upstream. The difference may be determined over receiving multiple bandwidth allocation maps while timing synchronization is maintained with timing server 114. For example, remote physical device 104 receives many bandwidth allocation maps over time and RPD clock adjustment engine 110 can determine the standard or average difference between the first timestamp and the second timestamp while timing synchronization is active. Remote physical device 104 may use a certain percentage of past bandwidth allocation maps, such as the last 10%.

At 210, RPD clock adjustment engine 110 adjusts RPD clock 108, if needed. RPD clock adjustment engine 110 then attempts to maintain that difference when timing synchronization is lost. That is, the difference may drift from 5 milliseconds to 4.9 milliseconds to 4.8 milliseconds, etc. Then, RPD clock adjustment engine 110 attempts to adjust the rate of RPD clock 108 to maintain the 5 millisecond difference. For example, RPD clock adjustment engine 110 may slow down the rate of RPD clock 108 to increase the difference if the difference is decreasing. Slowing down the RPD clock 108 reduces the rate at which maps are consumed by RPD 104 so the map advance time will increase back up to 5 ms. However, if the difference is increasing, such as from 5 milliseconds to 5.1 milliseconds, to 5.2 milliseconds, RPD clock adjustment engine 110 speeds up the rate of RPD clock 108 to counteract the increase in the difference. Speeding up the RPD clock 108 increases the rate at which maps are consumed by RPD 104 so the map the advance time will decrease down to 5 ms.

Figure 3:
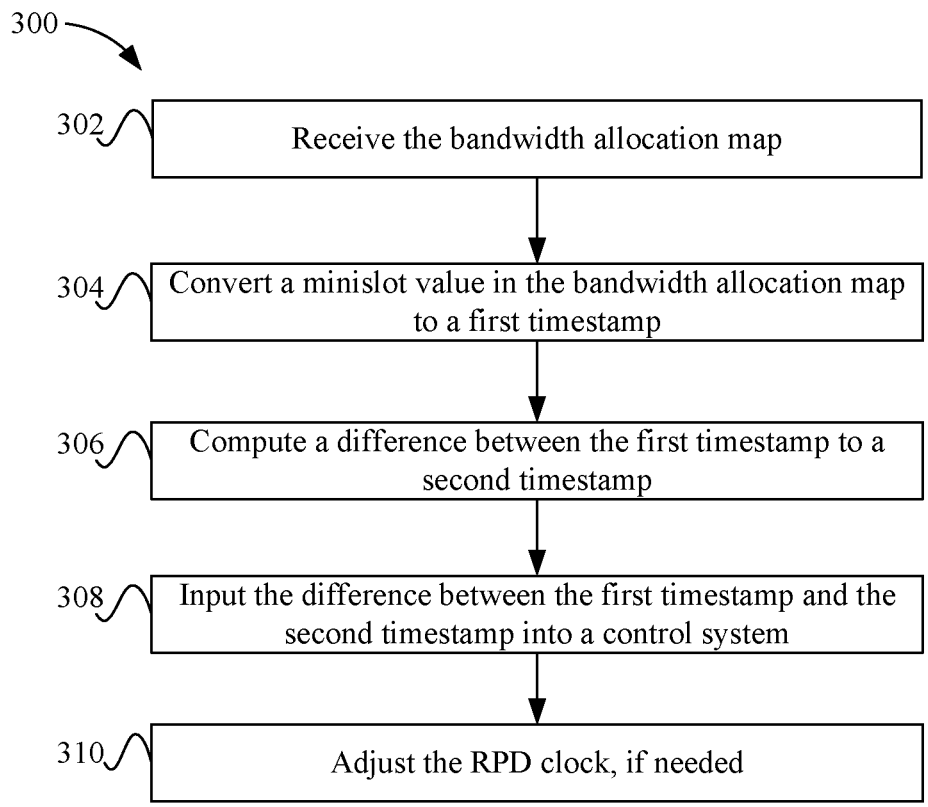
FIG. 3 depicts a simplified flowchart of a method for adjusting the RPD clock using minislot values according to some embodiments.

FIG. 3 depicts a simplified flowchart 300 of a method for adjusting RPD clock 108 using minislot values according to some embodiments. At 302, RPD clock adjustment engine 110 receives a bandwidth allocation map. At 304, RPD clock adjustment engine 110 converts a minislot value in the bandwidth allocation map to a first timestamp. For example, RPD clock adjustment engine 110 may use the first minislot value in the bandwidth allocation map. This minislot value may define the first time in which a first modem 106 can transmit a burst upstream. At 306, RPD clock adjustment engine 110 computes a difference between the first timestamp and the second timestamp.

At 308, RPD clock adjustment engine 110 inputs the difference between the first timestamp and the second timestamp into a control system, such as a phase locked loop (PLL). The phase locked loop may take input values and generate an output signal that is related to the phase of the input signal. In some embodiments, a Proportional-Integral (PI) controller may be used. Phase locked loops may be used to keep the difference that was determined while timing synchronization with timing server 114 constant when timing synchronization is lost. Although a phase locked loop is described, other control systems may be used to adjust RPD clock 108, if needed. At 310, the control system modifies RPD clock 108, if needed, such as by speeding up or slowing down the clock rate.

In some embodiments, the set point of the PI-controller would be current clock value+a sufficient advance (e.g., 5 ms) added to it for the maps to get to the modems 106 on time. The measured value would be the average of the timestamps derived from the minislot count in the bandwidth allocation maps. The error would be the difference between the set-point and the measured value. The PI controller would output an adjustment to apply to the oscillator of RPD clock 108 to slow the clock if the sign of the error indicated that it was running too fast and vice-versa.

Remote Physical Device

Figure 4:
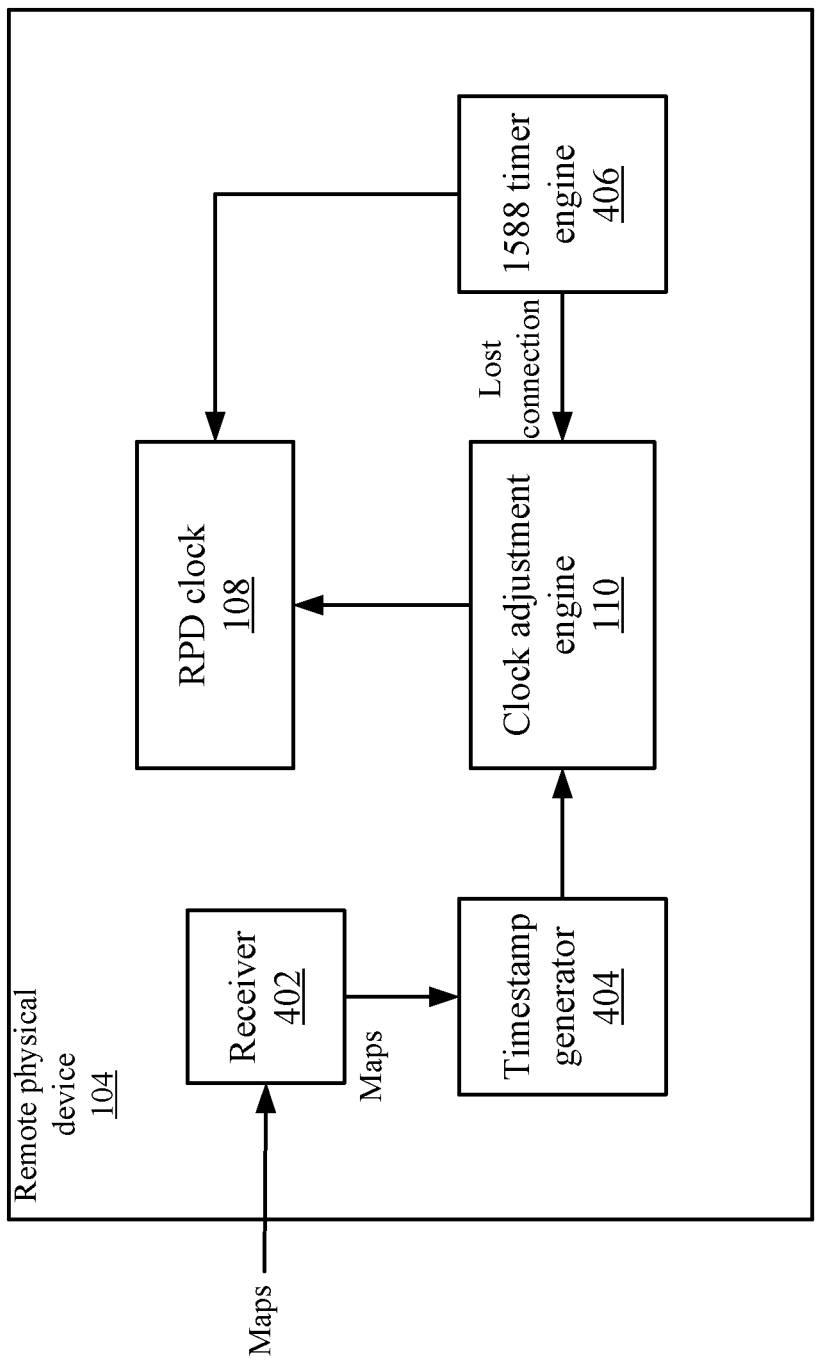
FIG. 4 depicts a more detailed example of a remote physical device according to some embodiments.

FIG. 4 depicts a more detailed example of remote physical device 104 according to some embodiments. A receiver 402 receives the bandwidth allocation maps. For example, receiver 402 may be a burst receiver that receives the maps. In some cases, the maps may be sent as normal downstream channel data and also sent to receiver 402.

A timestamp generator 404 generates the first timestamp from the bandwidth allocation maps. Additionally, timestamp generator 404 may generate the second timestamp based on the current time from RPD clock 108. Timestamp generator 404 may input the difference between the first timestamp and the second timestamp into RPD clock adjustment engine 110. However, clock adjustment engine 110 may not always use the difference to adjust RPD clock 108. Rather, prior to losing the connection, RPD clock uses 1588 timer engine 406 to maintain timing with timing server 114.

Once the connection is lost, 1588 timer engine 406 may notify clock adjustment engine 110. Then, RPD clock adjustment engine 110 may adjust RPD clock 108 based upon the difference received from timestamp generator 404. Accordingly, RPD clock 108 is now synchronized using clock adjustment engine 110 and not 1588 timer engine 406.

Headend 102 Clock Adjustment

In some embodiments, CCAP clock 116 may lose timing synchronization. CCAP clock adjustment engine 118 may then maintain the timing synchronization using a second source of timing information.

Figure 5:
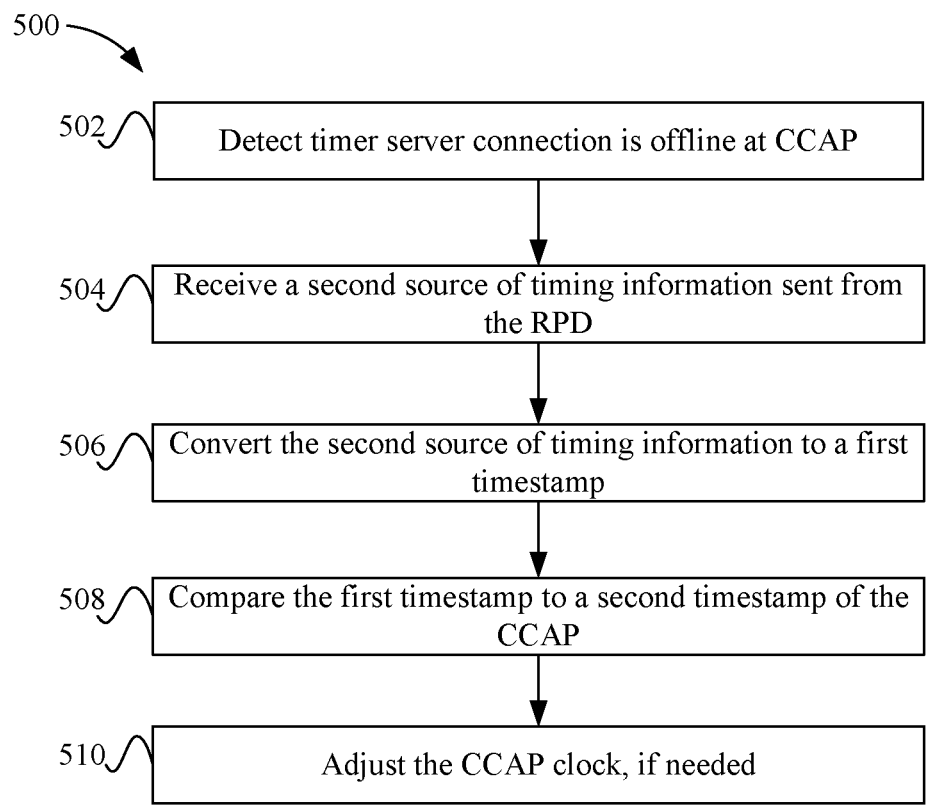
FIG. 5 depicts a simplified flowchart of a method for adjusting a CCAP clock according to some embodiments.

FIG. 5 depicts a simplified flowchart 500 of a method for adjusting CCAP clock 116 according to some embodiments. At 502, CCAP clock adjustment engine 118 detects that the connection with timing server 114 is offline. The detection may be based on headend 102 not receiving messages from timing server 114 or receiving the messages late. CCAP core 112 may have a more precise clock than RPDs 108 so CCAP clock 116 may drift very slowly. However, given enough time, CCAP clock 116 will drift significantly enough for modems 116 to go offline. In the case of a virtualized implementation of a CCAP core 112, a precise oscillator may not be in use so drift would occur more rapidly.

At 504, CCAP clock adjustment engine 118 receives a second source of timing information sent from remote physical device 104. The bandwidth allocation maps are generated by CCAP core 112 so cannot be used to adjust the timing of CCAP clock 116. However, modems 106 may send signals, such as bursts upstream, in the minislots allocated to them in the bandwidth allocation map. The bursts upstream may include the original minislot values. For example, a modem 106 includes the minislot value that is assigned to it in its burst upstream. The time that the burst is sent from the RPD 104 to the CCAP core 112 depends on the burst duration because RPD 104 waits for the burst to be received before it is sent to CCAP core 112. This creates a significant variation in the arrival time of bursts relative to the minislot value contained within them. One form of filtering is to ignore the timestamps of all bursts except a percentage, such as 1%, that have the smallest difference between the first and second timestamps. This should correspond to the bursts that were sent to CCAP core 112 the soonest after they were received by RPD 104. Although minislot values are described, other information may be included that is a source of timing information. For example, timestamps in which the bursts sent upstream may be included.

At 506, CCAP clock adjustment engine 118 converts the second source of timing information to a first timestamp. For example, CCAP clock adjustment engine 118 can perform the same conversion as described with respect to remote physical device 104 to convert minislot values to timestamps.

At 508, CCAP clock adjustment engine 118 compares the first timestamp to a second timestamp of the CCAP. For example, CCAP clock adjustment engine 118 uses the current time from CCAP clock 116 as the second timestamp. At 510, CCAP clock adjustment engine 118 adjusts CCAP clock 116, if needed. The minislot value is the time allocated to transmit a burst upstream. Headend 102 should receive the burst shortly thereafter. Thus, the current time of CCAP clock 116 should be relatively close to the first timestamp after filtering out the larger bursts that likely had a delayed transmission to CCAP core 112. If the earliest bursts upstream are arriving later than expected at headend 102, then it is possible that a rate of CCAP clock 116 is too slow. The difference between the first timestamp and the second timestamp may be getting larger in this case. Accordingly, CCAP clock adjustment engine 118 may adjust a rate of CCAP clock 116 to run faster. However, if the time difference is becoming smaller, then CCAP clock adjustment engine 118 may adjust a rate of CCAP clock 116 to run slower. As described with respect to remote physical device 104, there may be a difference between the first timestamp and the second timestamp that may be established when timing synchronization with timing server 114 was online. However, because the minislot value is closer to the current time at headend 102, the difference at CCAP adjustment engine 118 is different from RPD clock adjustment engine 110. Nevertheless, CCAP adjustment engine 118 attempts to maintain the difference that was previously determined while timing synchronization was online. CCAP adjustment engine 118 may also use a PLL to adjust CCAP clock 116 in a similar way as described above. For example, the difference between the burst timestamp (which is derived from the minislot count of the start of the upstream burst) and the CCAP clock timestamp is input to the PLL, which adjusts the CCAP clock 116.

Figure 6:
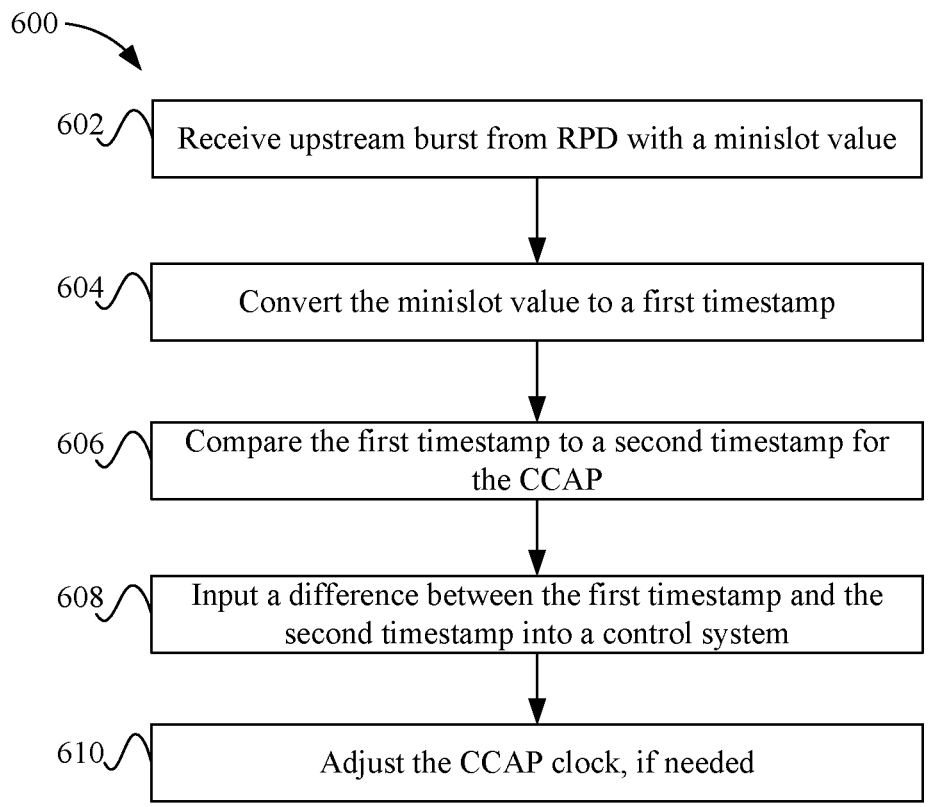
FIG. 6 depicts a simplified flowchart of a method for using the minislot values to adjust the CCAP clock according to some embodiments.

FIG. 6 depicts a simplified flowchart 600 of a method for using the minislot values to adjust CCAP clock 116 according to some embodiments. At 602, CCAP clock adjustment engine 118 receives an upstream burst from remote physical device 104 with a minislot value. At 604, CCAP clock adjustment engine 118 converts the minislot value to a first timestamp. At 606, CCAP clock adjustment engine 118 compares the first timestamp to a second timestamp for the CCAP.

At 608, CCAP clock adjustment engine 118 inputs the difference between the first timestamp and the second timestamp into a control system. For example, as discussed above, a phase locked loop or other control systems may be used. At 610, CCAP clock adjustment engine 118 adjusts the CCAP clock, if needed. For example, the phase locked loop may attempt to keep the difference established while timing server 114 was online constant during the time in which timing server 114 is offline.

Figure 7:
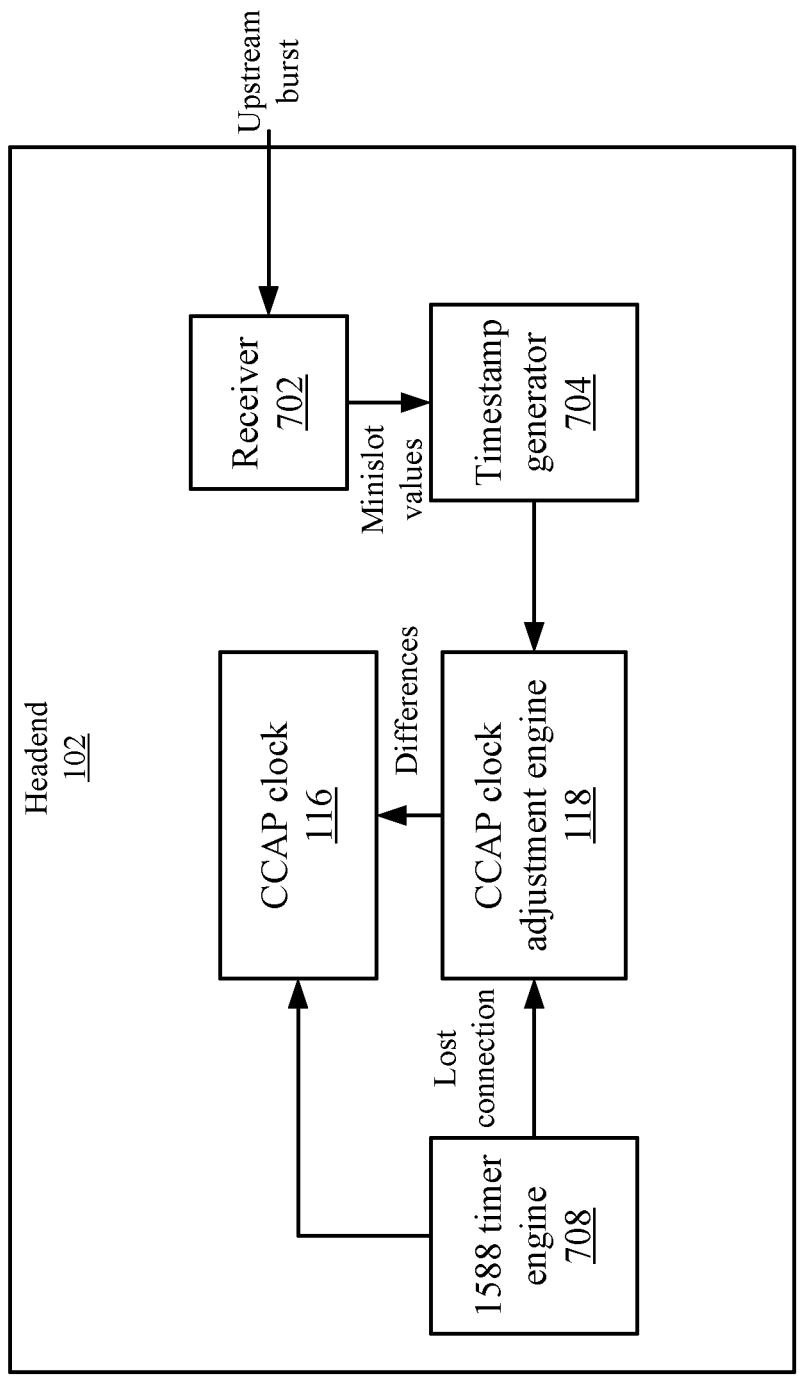
FIG. 7 depicts a more detailed example of a headend according to some embodiments.

FIG. 7 depicts a more detailed example of headend 102 according to some embodiments. A receiver 702 receives an upstream burst from remote physical device 104. As discussed above, the burst may include minislot values. Timestamp generator 704 uses the minislot values to generate the first timestamp. Also, timestamp generator 704 generates the second timestamp based on CCAP clock 116. Timestamp generator 704 may input the difference between the first timestamp and the second timestamp into CCAP clock adjustment engine 118. However, CCAP clock adjustment engine 118 may not always use the difference to adjust CCAP clock 116. Rather, prior to losing the connection, CCAP clock 116 uses 1588 timer engine 708 to maintain timing with timing server 114.

When a lost connection is detected, 1588 timer engine 708 sends an indication to CCAP clock adjustment engine 118. Then, CCAP clock adjustment engine 118 may adjust CCAP clock 116 based upon the difference received from timestamp generator 704. Accordingly, CCAP clock 116 is now synchronized using CCAP clock adjustment engine 118 and not 1588 timer engine 708. CCAP core 112 can synchronize itself to RPD clock 108 when CCAP core 112 has lost its own timing source. However, in some instantiations, a large number of RPDs 104 may be handled by a single CCAP core. Therefore, the CCAP core is synchronizing itself to the average of all of those RPDs 104.

Conclusion

Accordingly, some embodiments use a second source of timing information to maintain either CCAP clock 116 or RPD clock 108. The timing synchronization that is maintained does not lock CCAP clock 116 to RPD clock 108. Rather, the clock adjustment attempts to adjust one of the clocks such that modems 106 do not go offline. The adjustment uses timing information that is used in communications in system 100, such as minislot values in a bandwidth allocation map. This leverages information that is already being sent, such as from headend 102 to modem 106, or vice versa. Although information already being sent is described, it is possible that headend 102 may generate timing information that can be sent when the connection is lost with timing server 114.

At some point, timing server 114 may come back online. This allows CCAP core 112 and RPD 104 to reestablish timing with timing server 114, such as both can establish a 1588 lock after the interruption has ceased. Some embodiments adjust RPD clock 108 or CCAP clock 116 back towards the time of timing server 114 slowly without service interruption because either clock may not have drifted too far during the interruption due to using the second source of timing to adjust the clock rates.

System

Figure 8:
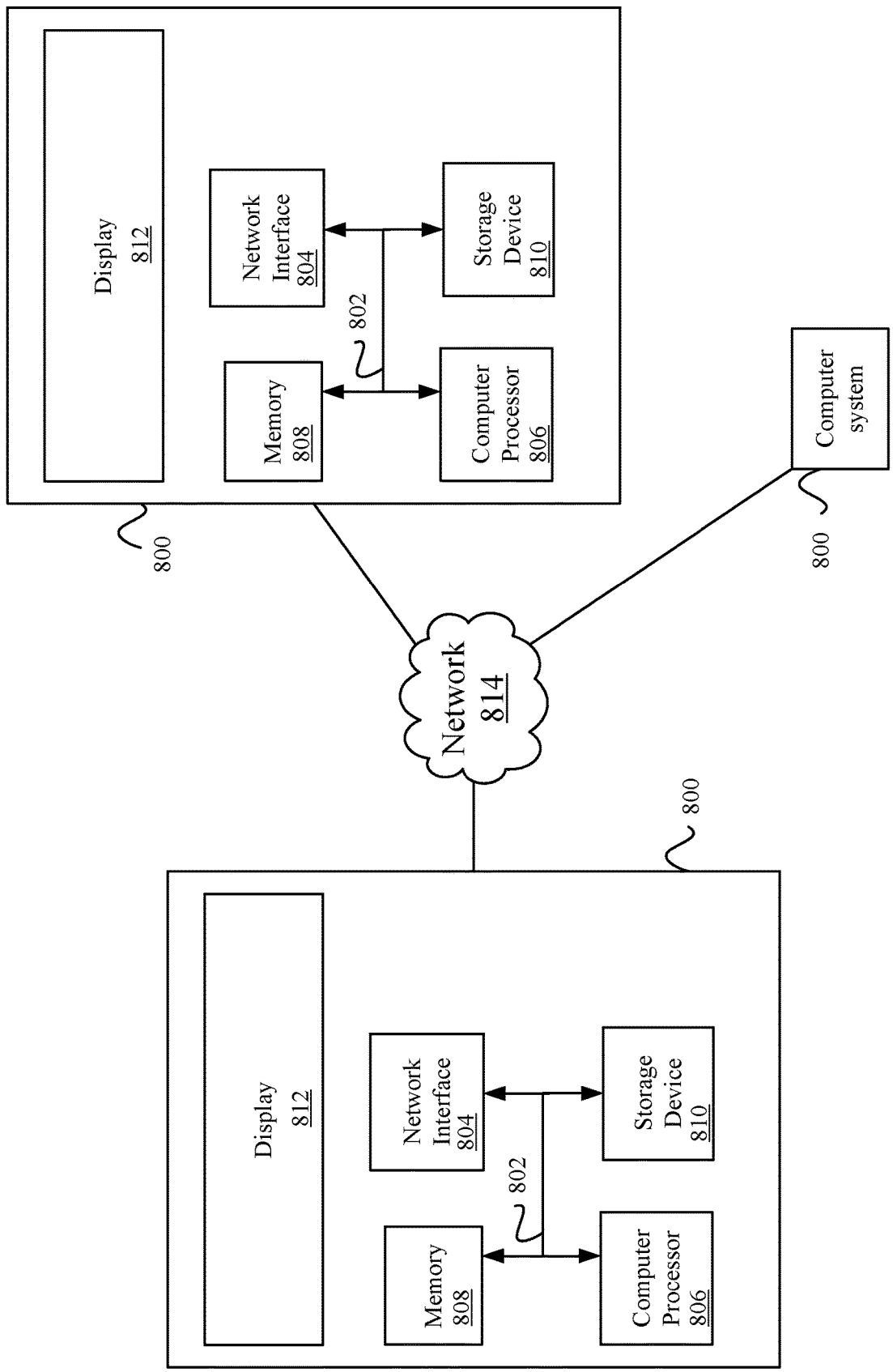
FIG. 8 illustrates an example of a special purpose computer systems configured with components of the headend and/or the remote physical device according to one embodiment.

FIG. 8 illustrates an example of a special purpose computer systems 800 configured with components of headend 102 and/or remote physical device 104 according to one embodiment. Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    detecting, by a first computing device, a loss of a connection to a first source of timing information that the first computing device and a second computing device use to synchronize a first clock of the first computing device and a second clock of the second computing device to a common time;
    receiving, by the first computing device, a second source of timing information from the second computing device, the second source of timing information also being transmitted to a third computing device;
    using, by the first computing device, the second source of timing information to determine a first timestamp;
    determining, by the first computing device, a second timestamp from the first clock; and
    using, by the first computing device, the first timestamp and the second timestamp to adjust a rate of the first clock, during an interval when said first clock and said second clock are not synchronized to a common time, wherein the first clock is used to transmit the second source of timing information from the second computing device to the third computing device.

2. The method of claim 1, wherein:
    the second source of timing information comprises a map that include information for when the third computing device is allowed to transmit upstream to the first computing device.

3. The method of claim 2, wherein the map that defines times for when the third computing device and other fourth computing devices are allowed to transmit upstream to the first computing device.

4. The method of claim 1, wherein the second source of timing information includes a value that defines a slot in which the third computing device is allowed to transmit upstream to the first computing device.

5. The method of claim 4, wherein the value is a minislot value that defines a time for the slot in which the third computing device is allowed to transmit upstream to the first computing device.

6. The method of claim 1, wherein using the first timestamp and the second timestamp comprises:
    comparing the first timestamp and the second timestamp; and
    using a result of the comparing to adjust the rate of the first clock.

7. The method of claim 1, wherein using the first timestamp and the second timestamp comprises:
    comparing a difference between the first timestamp and the second timestamp; and
    inputting the difference into a clock adjuster configured to adjust the rate of the first clock.

8. The method of claim 7, wherein the clock adjuster adjusts the first clock based on the difference compared to an expected difference.

9. The method of claim 8, wherein the expected difference comprises a time in which the third computing device has to receive the second source of timing information, process the second source of timing information, and send a communication upstream to the first computing device at a time corresponding to the first timestamp.

10. The method of claim 8, wherein the expected difference comprises a time in which the third computing device has to receive the second source of timing information, process the second source of timing information, and send a communication upstream to the first computing device at a time corresponding to the first timestamp.

11. The method of claim 7, wherein the clock adjuster comprises logic to adjust the rate of the first clock based on receiving a plurality of differences calculated from receiving multiple instances of the second source of timing information from the second computing device.

12. The method of claim 1, wherein the first source of timing information is from a separate timing server and is used to lock the first clock and the second clock together at a same rate.

13. The method of claim 12, wherein the adjustment of the first clock does not lock the first clock to the same rate as the second clock.

14. The method of claim 1, wherein one or more separate timing servers are used to provide the first source of timing information to the first computing device and the second computing device.

15. A non-transitory computer-readable storage medium containing instructions, that when executed, control a first computing device to be configured for:
    detecting a loss of a connection to a first source of timing information that the first computing device and a second computing device use to synchronize a first clock of the first computing device and a second clock of the second computing device to a common time;
    receiving a second source of timing information from the second computing device, the second source of timing information also being transmitted to a third computing device;

using the second source of timing information to determine a first timestamp;
determining a second timestamp from the first clock; and
using the first timestamp and the second timestamp to adjust a rate of the first clock, during an interval when said first clock and said second clock are not synchronized to a common time, wherein the first clock is used to transmit the second source of timing information from the second computing device to the third computing device.

16. A method comprising:
detecting, by a first computing device, a loss of a connection to a first source of timing information that the first computing device and a second computing device use to synchronize a first clock of the first computing device and a second clock of the second computing device to a common time;
sending, by the first computing device, a second source of timing information to the second computing device to be transmitted to a third computing device;
receiving, by the first computing device, a response from the third computing device, the response including the second source of timing information;
using, by the first computing device, the second source of timing information to determine a first timestamp;
determining, by the first computing device, a second timestamp from the first clock;
using, by the first computing device, the first timestamp and the second timestamp to adjust a rate of the first clock, during an interval when said first clock and said second clock are not synchronized to a common time wherein the first clock is used to transmit the second source of timing information from the first computing device to the third computing device.

17. The method of claim 16, the second source of timing information comprises a map that includes information for when the third computing device is allowed to transmit upstream to the first computing device.

18. The method of claim 16, wherein the second source of timing information includes a value that defines a slot in which the third computing device is allowed to transmit upstream to the first computing device.

19. The method of claim 18, wherein the value is a minislot value that defines a time for the slot in which the third computing device is allowed to transmit upstream to the first computing device.

20. The method of claim 18, wherein the value is included in the response from the third computing device.

* * * * *